(12) United States Patent
Hatayama et al.

(10) Patent No.: US 6,782,168 B2
(45) Date of Patent: Aug. 24, 2004

(54) APPARATUS FOR AND METHOD OF MONITORING WAVELENGTH MULTIPLEXED SIGNAL LIGHT AS WELL AS OPTICAL TRANSMISSION SYSTEM USING THE SAME

(75) Inventors: Hitoshi Hatayama, Yokohama (JP); Chisai Hirose, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/175,381

(22) Filed: Jun. 20, 2002

(65) Prior Publication Data

US 2003/0002798 A1 Jan. 2, 2003

(30) Foreign Application Priority Data

Jun. 22, 2001 (JP) .................................... 2001-190174

(51) Int. Cl.[7] .............................................. G02B 6/26
(52) U.S. Cl. .............................. 385/48; 385/24; 385/27; 398/9
(58) Field of Search ................. 385/14, 27, 39–47, 385/44–51, 24; 398/9, 13, 14, 17, 20, 33, 38, 34

(56) References Cited

U.S. PATENT DOCUMENTS

| 6,204,959 B1 | * | 3/2001 | Fujita et al. | .............. 359/337.2 |
| 2002/0030868 A1 | * | 3/2002 | Salomaa | ...................... 398/213 |
| 2002/0131104 A1 | * | 9/2002 | Johnson et al. | .............. 359/124 |

FOREIGN PATENT DOCUMENTS

| GB | 2191013 A | * | 12/1987 | ............. G02F/1/00 |
| JP | 04285836 A | * | 10/1992 | .......... G01M/11/00 |
| WO | WO 200041351 A2 | * | 7/2000 | ........... H04B/00/00 |

OTHER PUBLICATIONS

*Proceedings of the 1997 Communications Society Conference of the Institute of Electronics, Information and Communication Engineers*, B–10–60, pp. 359.

*Proceedings of the 1998 Institute of Electronics, Information and Communication Engineers General Conference*, C–3–113, pp. 279.

H. Suzuki, N. Takachio, O. Ishida & M. Koga, "Dynamic Gain Control by Maximum Signal Power Channel in Optical Linear Repeaters for WDM Photonic Transport Networks," *IEEE Photonics Technology Letters*, vol. 10, No. 5, May 1998, pp. 734–736.

* cited by examiner

*Primary Examiner*—Hemang Sanghavi
*Assistant Examiner*—Scott Alan Knauss
(74) *Attorney, Agent, or Firm*—McDermott Will & Emery LLP (57) ABSTRACT

The invention provides an apparatus for and method of monitoring wavelength multiplexed signal light, which can obtain monitored data for multi-channel optical signals contained in the wavelength multiplexed signal light, which can avoid a large size and complicated structure and high cost of monitoring apparatus, and which can easily monitor the wavelength multiplexed signal light. The invention also provides an optical transmission system employing the monitoring apparatus and method. An optical filter being able to control a loss pattern is disposed on a monitoring waveguide for the wavelength multiplexed signal light, which is branched for monitoring from an input waveguide and an output waveguide constituting a main optical transmission path in a wavelength multiplexed signal light monitoring apparatus. While the optical filter sets a plurality of loss patterns in sequence, the wavelength multiplexed signal light having passed through the optical filter is detected by a photodiode for each of the loss patterns, and monitored data of the wavelength multiplexed signal light can be obtained from detected data.

14 Claims, 10 Drawing Sheets

APPARATUS FOR AND METHOD OF MONITORING WAVELENGTH MULTIPLEXED SIGNAL LIGHT AS WELL AS OPTICAL TRANSMISSION SYSTEM USING THE SAME

BACKGROUND OF THE INVENTION

1. Field of the Invention

The present invention relates to an apparatus for and method of monitoring the number and power of optical signals contained in wavelength multiplexed signal light for use in a wavelength division multiplexing optical transmission system, as well as, to an optical transmission system employing such monitoring apparatus and method.

2. Description of the Related Art

To meet the social needs arising from the influx of the advanced information society, intensive research and development have been conducted on broadband high-speed communications such as image communications and long-haul communications such as international communications both utilizing an optical-fiber transmission network. A wavelength division multiplexing (WDM) transmission system for transmitting multi-channel optical signals having different wavelengths from each other through an optical-fiber line to realize high-speed broadband optical communications has been developed and put into practice.

For stable operation of a WDM transmission system, it is important that status of wavelength multiplexed signal light, such as number and power of optical signals contained in the wavelength multiplexed signal light, be held within a predetermined range. To that end, a wavelength multiplexed signal light monitoring apparatus is proposed for monitoring the signal light and obtaining monitored data of the signal light status at successive points in time.

Such a wavelength multiplexed signal light monitoring apparatus is described, for example, in Ref. 1 "Proceedings of the 1997 Communications Society Conference of the Institute of Electronics, Information and Communication Engineers, B-10-60, p. 359". This apparatus comprises a combination of an arrayed waveguide grating (AWG) and light receiving devices for detecting respective demultiplexed optical signals, thereby monitoring wavelength multiplexed signal light. Also, a module comprising an AWG and photodetectors all monolithically integrated on an indium phosphide substrate is described in Ref. 2 "Proceedings of the 1998 the Institute of Electronics, Information and Communication Engineers General Conference, C-3-113, p. 279".

The number of optical signals multiplexed in a signal light has been increased up to 100 so far. In the wavelength multiplexed signal light monitoring apparatus having the above-described structure, the plurality of optical signals (channels) contained in the wavelength multiplexed signal light are demultiplexed, and the light receiving devices are provided on a one-to-one relation to the respective channels for monitoring the presence or absence, and power of the optical signal for each of the channels.

Therefore, a large size AWG has been required and also the size of a corresponding light receiving device array has also been increased. In addition, the monitoring apparatus has been increased in size and has become complicated in its structure. Another problem is that the same number of light receiving devices as that of channels must have been provided, and hence high cost of the monitoring apparatus has become a problem.

SUMMARY OF THE INVENTION

It is an object of the present invention to provide an apparatus for and method of monitoring wavelength multiplexed signal light, that can obtain monitored data for multi-channel optical signals contained in the wavelength multiplexed signal light, and that may avoid a larger size and complicated structure and higher cost of the monitoring apparatus, thus enabling it to monitor easily the wavelength multiplexed signal light. The present invention also relates to an optical transmission system employing such monitoring apparatus and method.

In order to achieve this object, an apparatus is provided for monitoring wavelength multiplexed signal light containing multi-channel optical signals having different wavelengths from each other within a transmission band. The apparatus comprises an input optical waveguide; an output optical waveguide; an optical branching unit disposed between these two optical waveguides for branching a part of the signal light to a monitoring optical waveguide; a controllable optical filter installed on the monitoring optical waveguide to give a loss pattern to the optical signals; and a light detecting unit disposed at an output end of the monitoring optical waveguide.

The optical filter may be designed so that it can control the loss pattern depending on an electrical control signal. Such an optical filter may comprise a main waveguide for guiding the signal light from the optical branching unit to the light detecting unit; a sub-waveguide optically coupled to the main waveguide through a first optical coupler and a second optical coupler, the sub-waveguide constituting a Mach-Zehnder interferometer together with the main waveguide, the first and the second optical couplers; and a temperature adjusting unit for adjusting the temperature of at least one of the main and the sub-waveguides located between the first and the second optical couplers, thereby controlling the loss pattern.

The optical branching unit and the optical filter may be formed on the same substrate, as a planar lightwave circuit. Further, the optical branching unit may be an optical coupler having a coupling ratio of not more than 10%.

The apparatus for monitoring wavelength multiplexed signal light may further comprise an operating circuit for obtaining monitored data of multi-channel optical signals from the data of the wavelength multiplexed signal light detected by the light detecting unit for each of different loss patterns which have been set successively by the optical filter.

A method of monitoring wavelength multiplexed signal light containing multi-channel optical signals having different wavelengths from each other within a transmission band is also provided. The method comprises a step of branching a part of the signal light to a monitoring optical waveguide; a step of giving a loss pattern to the optical signals contained in the branched signal light; and a step of detecting the branched signal light to which the loss pattern has been given, wherein the loss pattern giving step and the light detecting step being performed several times while setting a plurality of loss patterns different from each other several times.

The method of monitoring wavelength multiplexed signal light may further comprise a step of obtaining monitored data of multi-channel optical signals contained in the wavelength multiplexed signal light, which have been detected in the detecting step.

By setting the number of loss patterns to be equal to that of optical signals, the monitored data of the respective optical signals may be obtained from the detected data for the respective loss patterns.

Furthermore, an optical transmission system is provided, the system comprising an optical transmission line through which is transmitted wavelength multiplexed signal light containing multi-channel optical signals having different wavelengths from each other within a transmission band; and a wavelength multiplexed signal light monitoring apparatus disposed on the optical transmission line for monitoring the signal light. The optical transmission system may further comprise a signal light control unit for controlling the status of signal light based on monitored data of multi-channel optical signals obtained by the apparatus.

The present invention is further explained below by referring to the accompanying drawings. The drawings are provided solely for the purpose of illustration and are not intended to limit the scope of the invention.

DESCRIPTION OF THE PREFERRED EMBODIMENTS

Embodiments of the present invention are explained below by referring to the accompanying drawings. In the drawings, the same number refers to the same part to avoid duplicate explanation. The ratios of the dimensions in the drawings do not necessarily coincide with the explanation.

Figure 1:
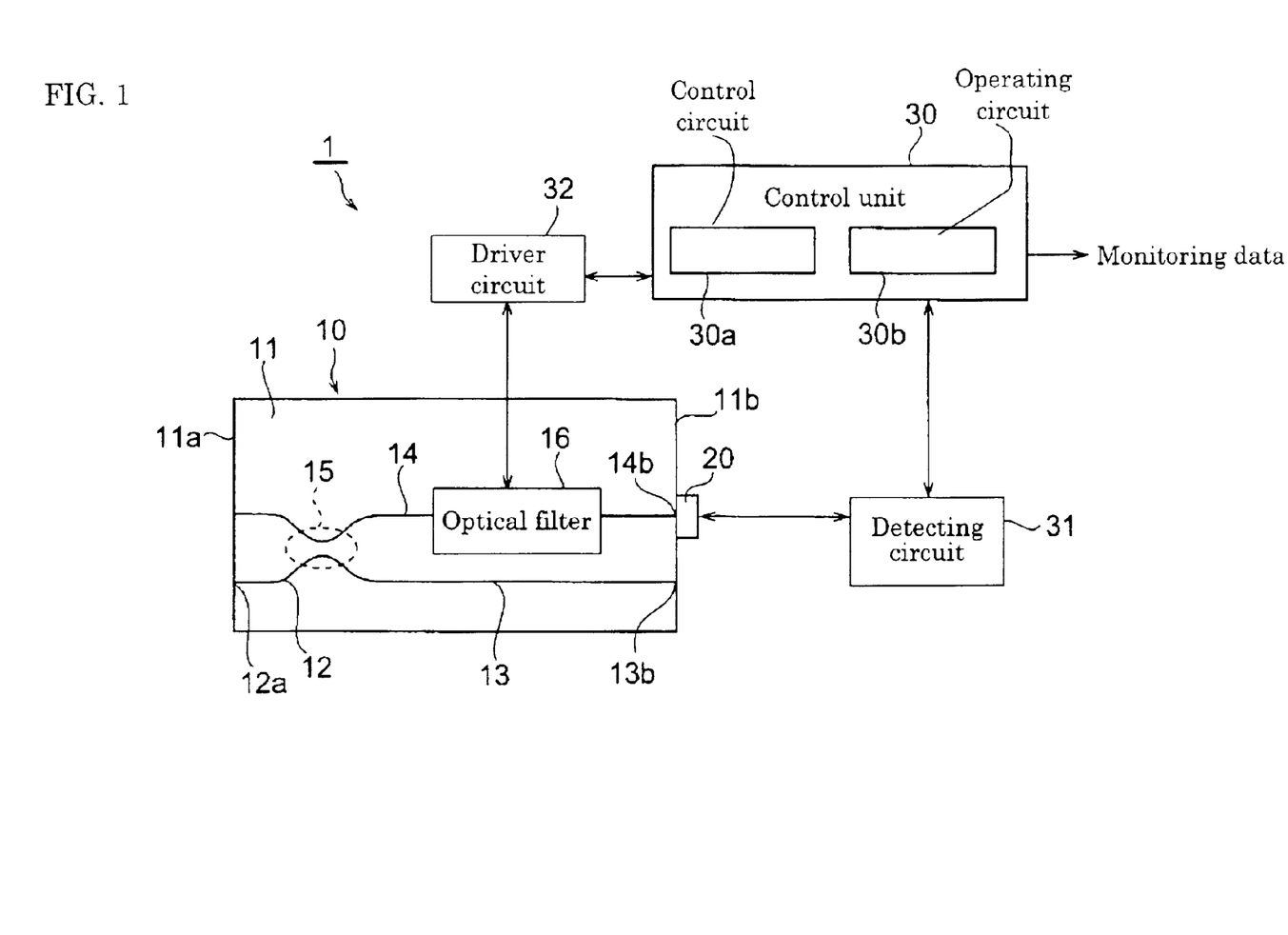
FIG. 1 is a block diagram showing one embodiment of an apparatus for monitoring wavelength multiplexed signal light.

FIG. 1 shows one embodiment of an apparatus for monitoring wavelength multiplexed signal light according to the present invention. A wavelength multiplexed signal light monitoring apparatus 1 of this embodiment is intended to monitor wavelength multiplexed signal light having multi-channel optical signals having different wavelength from each other within a transmission band. The monitoring apparatus 1 comprises a lightwave circuit device 10 containing an optical branching means and an optical filter, both described later, and a photodiode 20 serving as a light detecting means.

Lightwave Circuit Device

The lightwave circuit device 10 contains a planar lightwave circuit comprising an input waveguide 12, an output waveguide 13, and a monitoring waveguide 14, which are all disposed on a substrate 11. An input port 12a is disposed at an input end face 11a on one side of the substrate 11 to receive wavelength multiplexed signal light to be monitored by the monitoring apparatus 1. Also, at an output end face 11b on the other side of the substrate 11 opposing to the input end face 11a, an output port 13b is disposed to emanate, as an output, the wavelength multiplexed signal light having passed through the monitoring apparatus 1. The input waveguide 12 and the output waveguide 13 are formed as one serially interconnected optical waveguide extending between the input port 12a and the output port 13b.

The monitoring waveguide 14 to be used for monitoring the wavelength multiplexed signal light is provided in addition to the main optical waveguide comprising the waveguide 12 and 13 described above. One end of the monitoring waveguide 14 is optically coupled to the main optical waveguide, through an optical coupler 15 serving as an optical branching means.

In the structure explained above, the wavelength multiplexed signal light having entered, as a monitoring target, the input waveguide 12 from the input port 12a passes through the optical coupler 15 and emanates from the output port 13b through the output waveguide 13. At the same time, a part of the wavelength multiplexed signal light is branched, as signal light to be monitored, to the monitoring waveguide 14 by the optical coupler 15 (optical branching step).

The other end of the monitoring waveguide 14 serves as an output end 14b disposed at the end face 11b of the substrate 11. Then, an optical filter 16 is disposed in a portion of the monitoring waveguide 14 between the optical coupler 15 and the output end 14b. The optical filter 16 gives, to the multi-channel optical signals contained in the wavelength multiplexed signal light, losses corresponding to the respective wavelengths of the optical signals (loss pattern giving step).

The wavelength-multiplexed signal light having passed through the optical filter 16 and given respective predetermined losses emanates from the output end 14b of the monitoring waveguide 14. The photodiode 20 serving as the light detecting means is connected to the output end 14b. The wavelength multiplexed signal light having emanated from the output end 14b is detected by the photodiode 20 (light detecting step). The photodiode 20 emanates, as a signal to be detected, data having obtained by detecting the wavelength multiplexed signal light, and, by employing such signal, monitors the wavelength multiplexed signal light.

The losses given by the optical filter 16 to the respective optical signals contained in the wavelength multiplexed signal light are determined by a loss pattern set by the optical filter 16. The monitoring apparatus 1 shown in FIG. 1 employs, as the optical filter 16, an optical filter giving losses in a substantially linear relation to wavelengths (loss slope to wavelength). An inclination of the slope is controllable.

When a single photodiode 20 is employed as the light detecting means for detecting the wavelength multiplexed signal light, total power of all the optical signals contained in the wavelength multiplexed signal light can be detected. Accordingly, monitored data indicating the presence or absence of transmission and power for each of the multi-channel signals cannot be obtained by this photodiode only.

In a method of monitoring the wavelength multiplexed signal light which is performed using the monitoring apparatus 1, a plurality of loss slopes different from each other are set one by one sequentially in the loss pattern giving step. Then, the wavelength multiplexed signal light having passed through the optical filter 16 and been given the predetermined loss for each of the optical signals can be detected by the photodiode 20 by the plural times. As a result, necessary data to be monitored regarding the status of the plural optical signals can be obtained even with the photodiode 20 employing a single light detecting means.

The above-explained structure eliminates the need of employing an optical demultiplexing means such as an AWG to demultiplex the wavelength multiplexed signal light for each of the optical signals (each wavelength), and also reduces the number of light detecting means, such as photodiodes, as compared with the number of optical signals. Therefore, it is possible to avoid a larger sized, more complicated and higher cost of the monitoring apparatus, and, at the same time, to easily monitor status of the multi-channel optical signals contained in the wavelength multiplexed signal light. In the monitoring apparatus 1, if the loss slope set by the optical filter 16 is variable within a sufficient range, necessary monitoring data can be satisfactorily obtained by a smaller-sized, lower-cost monitoring apparatus despite an increase in the number of channels.

Preferably, an optical filter capable of being controlled in accordance with an electrical control signal is employed as the optical filter 16. Employing such an optical filter enables the loss slope of the optical filter 16 to be automatically controlled at high speed, and the wavelength multiplexed signal light to be more effectively monitored.

Also, like the lightwave circuit device 10 shown in FIG. 1, the optical coupler 15 serving as an optical branching means and the optical filter 16 are preferably formed as a planar lightwave circuit integrated on the same substrate 11. This arrangement is effective particularly in reducing the size of the monitoring apparatus 1. Further, the manufacturing cost of the monitoring apparatus 1 can be reduced. Depending on the practical structure of the monitoring apparatus, however, lightwave circuits disposed on separate substrates and connected to each other may be employed.

Moreover, an optical coupler having a coupling ratio of not more than 10% is preferably employed as the optical coupler 15. Employing such an optical coupler makes it possible to satisfactorily control a loss of the wavelength multiplexed signal light, which has passed through main waveguide of the monitoring apparatus 1. In practice, the loss of the main waveguide can be controlled to about 0.5 dB or less under the above-explained condition of the coupling ratio.

Control Unit

Further description on the structure of the wavelength multiplexed signal light monitoring apparatus 1 of this embodiment will be given below. In the monitoring apparatus 1 of FIG. 1, a control unit 30, a detecting circuit 31, and a driver circuit 32 are provided in addition to the lightwave circuit device 10 and the photodiode 20 both described above.

The control unit 30 shown in FIG. 1 comprises a control circuit (or control function) 30a for controlling the operation of various components of the monitoring apparatus 1 to perform necessary monitoring of the wavelength multiplexed signal light, and an operating circuit 30b. The operating circuit 30b carries out necessary calculation based on the data of the wavelength multiplexed signal light detected by the photodiode 20, thereby obtaining monitored data of the wavelength multiplexed signal light (step of obtaining monitored data).

The detecting circuit 31 and the driver circuit 32 are both connected to the control unit 30. In accordance with an instruction given as a control signal from the control unit 30, the detecting circuit 31 controls an operation of the photodiode 20 for detecting the wavelength multiplexed signal light. Also, the detecting circuit 31 executes necessary signal processing of the detected signal from the photodiode 20 and sends the processed data to the control unit 30. On the other hand, the driver circuit 32 drives and controls the optical filter 16 in accordance with an instruction given as a control signal from the control unit 30. In particular, the driver circuit 32 controls the loss slope set by the optical filter 16, which is controllable as explained above.

Monitoring Method

The wavelength multiplexed signal light monitoring method implementing the monitoring apparatus 1 of FIG. 1 will be described below with regards to, in particular, a method of obtaining the monitored data of the wavelength multiplexed signal light, as a result of calculation executed in the operating circuit 30b of the control unit 30. It is assumed here that the wavelength multiplexed signal light received to the monitoring apparatus 1 to be detected contains optical signals of N channels (N being an integer not less than 2) having different wavelengths from each other, and the wavelengths are given as:

"$\lambda_1, \lambda_2, \ldots, \lambda_j, \ldots, \lambda_N$ "(provided, $\lambda_1 < \lambda_2 < \ldots < \lambda_N$), respectively.

Figure 2:
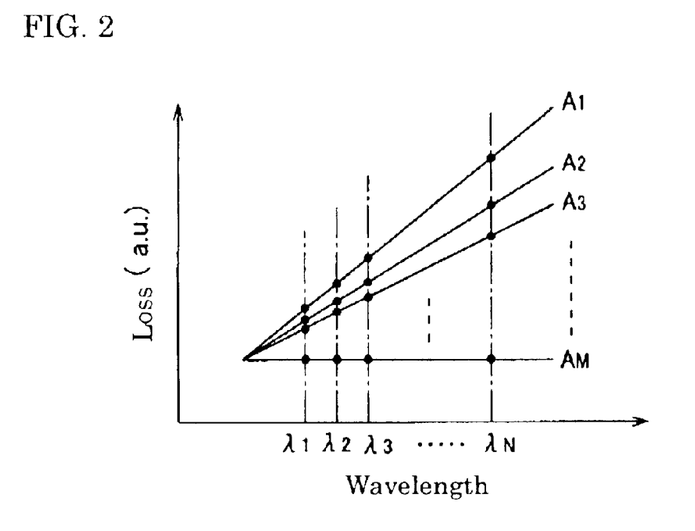
FIG. 2 is a graph showing one example of a loss pattern set by an optical filter.

FIG. 2 is a graph showing one example of a loss pattern set by an optical filter. In the graph of FIG. 2, the horizontal axis represents wavelength $\lambda$. The vertical axis represents a loss given to the optical signal at each wavelength through the optical filter 16. Lines $A_1, A_2, \ldots, A_i, \ldots, A_M$ (M being an integer not less than 2) represent M kinds of loss slopes set by the optical filter 16.

In the monitoring method of this embodiment, the optical filter 16 successively sets the plurality of loss slopes $A_1$ to $A_M$ different from each other, and the photodiode 20 detects the wavelength multiplexed signal light to which each of the loss slopes has been given. Then, the operating circuit 30b executes the necessary calculation based on M sets of detected data obtained by setting the M kinds of loss slopes, thereby obtaining monitoring data of the optical signals, N channels at wavelength of $\lambda_1$ to $\lambda_N$ that have been contained in the wavelength multiplexed signal light. As a result, necessary data of the wavelength multiplexed signal light, such as the number and power of optical signals being transmitted at each time can be effectively obtained as the monitoring data.

In the example of FIG. 2, the losses at wavelengths shorter than the transmission band including a range of the wavelength $\lambda_j$ (j=1 to N) are substantially equal to each other. Further, at each optical signal wavelength $\lambda_j$, the losses given to the optical signals are different depending on each loss slope $A_1$.

It is assumed here that $P_j$ (j=1 to N) represents power of the optical signal having the wavelength $\lambda_j$ and being contained in the wavelength multiplexed signal light entering the optical filter 16 having been branched by the optical coupler 15. Also, it is assumed that $Q_i$ (i=1 to M) represents power of the wavelength multiplexed signal light detected by the photodiode 20 after having passed through the optical filter 16 when the loss slope is set to $A_1$. Further, it is assumed that $a_{ij}$ represents a transmittance of the optical signal at wavelength $\lambda_j$ having passed through the optical filter 16 in which the loss slope is set to $A_1$. On that condition, the entering light power $P_j$ and the detected light power $Q_i$ satisfy the following equation expressed using matrices:

$$\begin{pmatrix} Q_1 \\ Q_2 \\ \vdots \\ Q_M \end{pmatrix} = \begin{pmatrix} a_{11} & a_{12} & \cdots & a_{1N} \\ a_{21} & a_{22} & & \\ \vdots & & \ddots & \vdots \\ a_{M1} & \cdots & \cdots & a_{MN} \end{pmatrix} \begin{pmatrix} P_1 \\ P_2 \\ \vdots \\ P_N \end{pmatrix} \quad (1)$$

By solving the above Eq. (1), the monitored data for the multi-channel optical signals contained in the wavelength multiplexed signal light can be obtained.

The number M of loss slopes $A_i$ is preferably set to N, i.e., equal to the channel number (N) of optical signals contained in the wavelength multiplexed signal light. In that case, a number N of monitored data representing respective status of the N channels optical signals can be obtained using a number N of detected data obtained for each of the loss slopes. Thus, the monitored data regarding the presence or absence of transmission and power can be obtained for each of the N channel optical signals.

It is now assumed that the number N of optical signals and the number M of loss slopes is four (N=M=4), and four kinds of loss slopes $A_1$, $A_2$, $A_3$, $A_4$, are set by the optical filter 16 sequentially for the four channel optical signals having entering power levels $P_1$, $P_2$, $P_3$, $P_4$ at wavelength $\lambda_1$, $\lambda_2$, $\lambda_3$, $\lambda_4$. In such a case, light power levels $Q_1$, $Q_2$, $Q_3$, $Q_4$ detected by the photodiode 20 respectively corresponding to the loss slopes are expressed by the following equation using a 4×4 matrix $(a_{ij})$ of transmittances corresponding to the loss slopes $A_1$, $A_2$, $A_3$, $A_4$:

$$\begin{pmatrix} Q_1 \\ Q_2 \\ Q_3 \\ Q_4 \end{pmatrix} = (a_{ij}) \begin{pmatrix} P_1 \\ P_2 \\ P_3 \\ P_4 \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} P_1 \\ P_2 \\ P_3 \\ P_4 \end{pmatrix} \quad (2)$$

Then, with the reverse matrix $(a_{ij})^{-1}$, the power levels $P_1$, $P_2$, $P_3$, $P_4$ which are monitored data of the optical signals contained in the wavelength multiplexed signal light can be expressed by the following equation using the detected power levels $Q_1$, $Q_2$, $Q_3$, $Q_4$.

$$\begin{pmatrix} P_1 \\ P_2 \\ P_3 \\ P_4 \end{pmatrix} = (a_{ij})^{-1} \begin{pmatrix} Q_1 \\ Q_2 \\ Q_3 \\ Q_4 \end{pmatrix} \quad (3)$$

Each transmittance $a_{ij}$ contained in the matrix $(a_{ij})$ may be determined beforehand by measuring a loss of an optical signal having a single wavelength using the optical filter 16.

Also, the loss slopes $A_1$ to $A_M$ set by the optical filter 16 may be consecutively changed at a cycle of M times. In that case, the calculation for obtaining the monitored data is executed in correspondence with the cycle at which the loss slope is changed.

Figure 3:
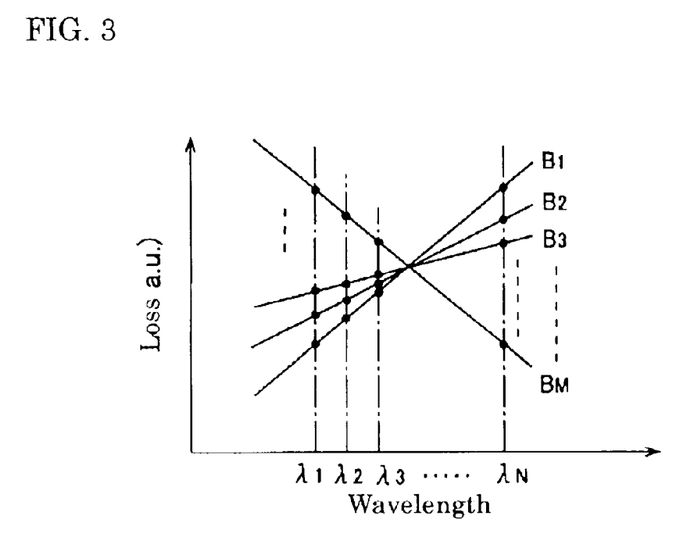
FIG. 3 is a graph showing another example of the loss pattern set by the optical filter.
Figure 4:
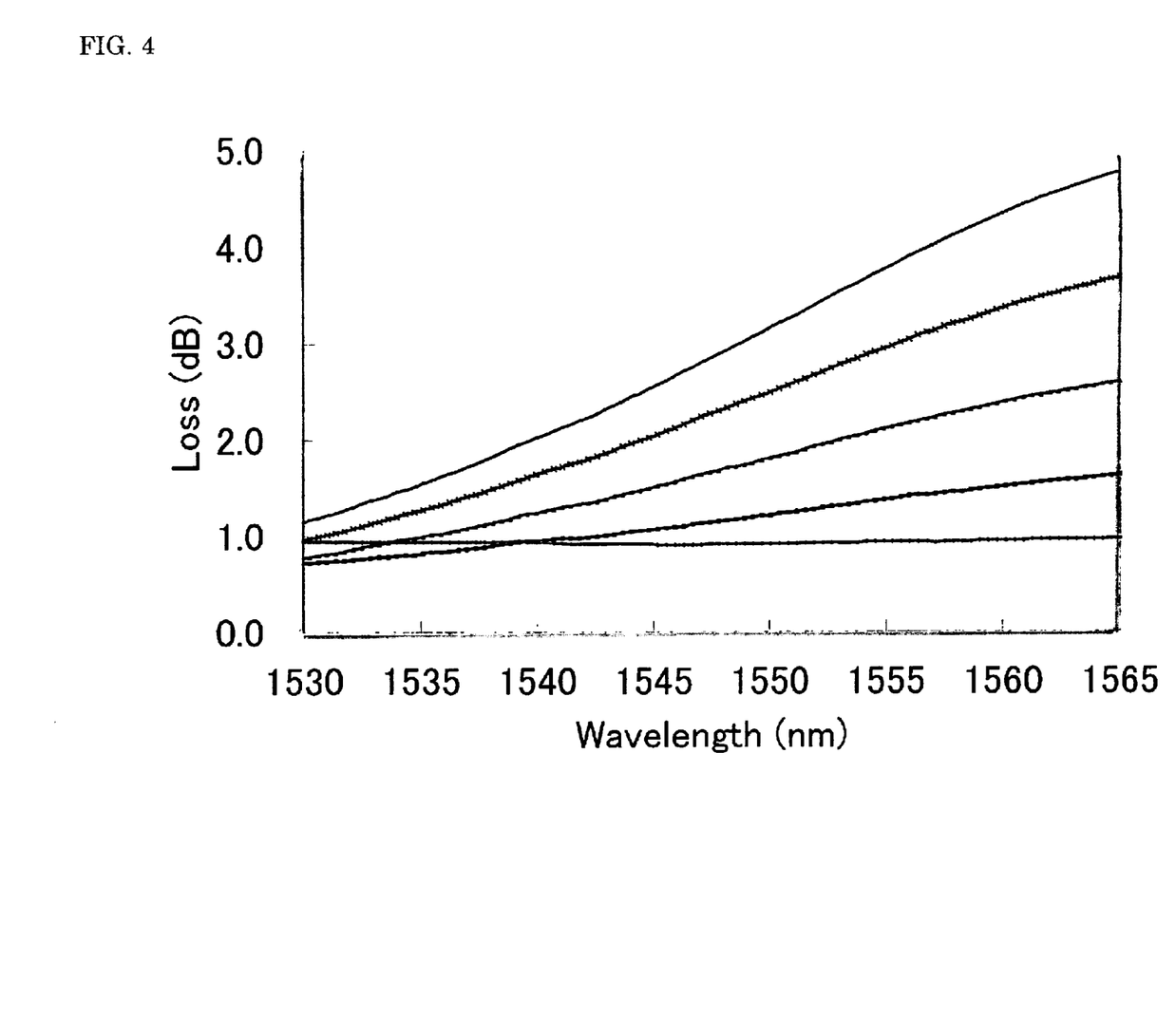
FIG. 4 is a graph showing one more example of the loss pattern set by the optical filter.

Concerning the loss slope $A_i$ variably controlled by the optical filter 16, various shapes of loss slopes can be utilized in addition to the examples shown in FIG. 2. As shown in FIG. 3, with respect to loss slopes $B_i$ (i=1 to M), losses given to respective optical signals may be substantially equal to each other at a certain wavelength in the transmission band including optical signal wavelengths $\lambda_j$ (j=1 to N). In that case, at optical signal wavelengths $\lambda_j$ other than the specified one, losses which have been given to the respective optical signals have different magnitudes for each of the loss slopes $B_i$. Further, as shown in FIG. 4, the respective optical signals may not have any wavelength at which losses become equal.

Optical Filter

Figure 5:
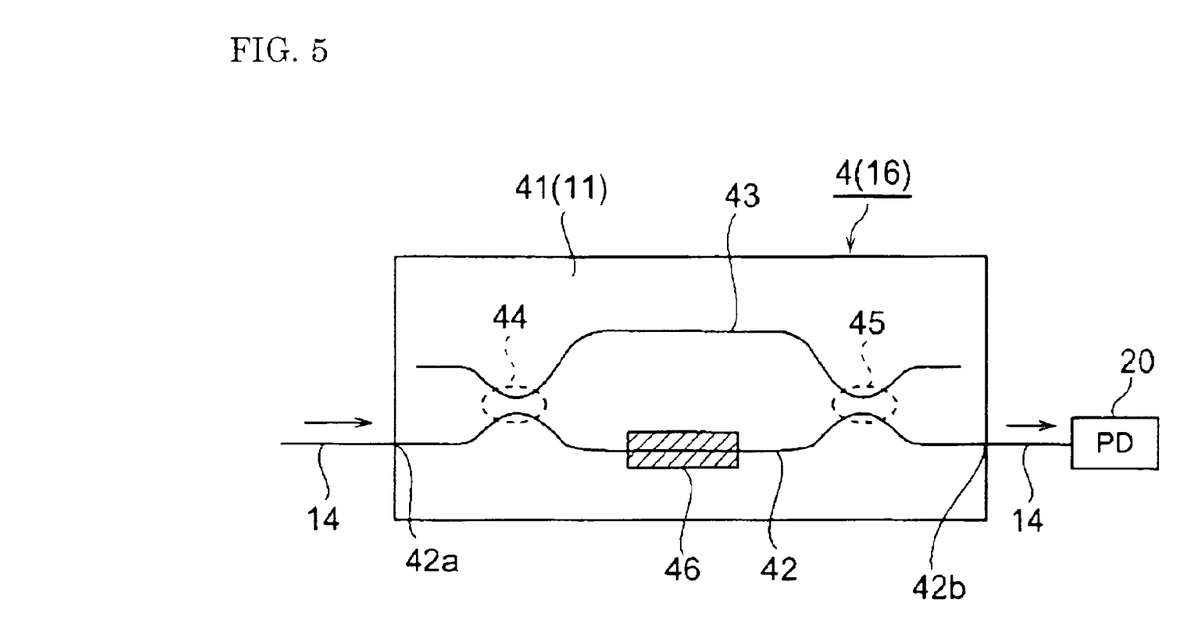
FIG. 5 is a schematic view showing one example of the optical filter used in the apparatus shown in FIG. 1.

FIG. 5 shows one example of the optical filter used in the apparatus for monitoring wavelength multiplexed signal light shown in FIG. 1. The optical filter 16 shown in FIG. 5 is constituted as a Variable Attenuation Slope Compensator (VASC) 4 that loss slope to wavelength is variable and can control the loss slope in accordance with an electrical control signal. The VASC 4 is formed on a substrate 41, as a planar lightwave circuit, and comprises a main waveguide 42, a sub-waveguide 43 and a heater 46. The substrate 41 may be a part of the substrate 11 of the lightwave circuit device 10 shown in FIG. 1.

The main waveguide 42 is an optical waveguide extended between an input terminal 42a serving as a junction with the monitoring waveguide 14 on the optical coupler 15 side and an output terminal 42b serving as a junction with the waveguide 14 on the photodiode 20 side, for guiding the wavelength multiplexed signal light from the input terminal 42a to the output terminal 42b. A first optical coupler 44 and a second optical coupler 45 are disposed along the main waveguide 42 sequentially in a direction from the input terminal 42a toward the output terminal 42b.

On the other hand, the sub-waveguide 43 is an optical waveguide for giving respective predetermined losses to multi-channel optical signals contained in the wavelength multiplexed signal light guided through the main waveguide 42. The sub-waveguide 43 is optically coupled to the main waveguide 42 through the first and the second optical couplers 44 and 45. Then, the main waveguide 42, the sub-waveguide 43, the first and the second optical couplers 44 and 45 constitute a Mach-Zehnder interferometer.

The heater 46 is a temperature adjusting means for adjusting the temperature of the main waveguide 42 that is disposed between the first and the second optical couplers 44 and 45. By adjusting the temperature of the main waveguide 42, the heater 46 controls an amount of phase change for each of the optical signals contained in the wavelength multiplexed signal light guided through the main waveguide 42, thereby controlling the loss given to the optical signal between the input and output terminals, 42a and 42b.

With that arrangement, the amount of phase change has a different value for each of the optical signals contained in the wavelength multiplexed signal light. Accordingly, by adjusting the temperature of the optical waveguide to control the losses of the optical signals with the heater 46, the VASC 4 is able to variably control the loss slope at each wavelength within the transmission band.

Figure 6:
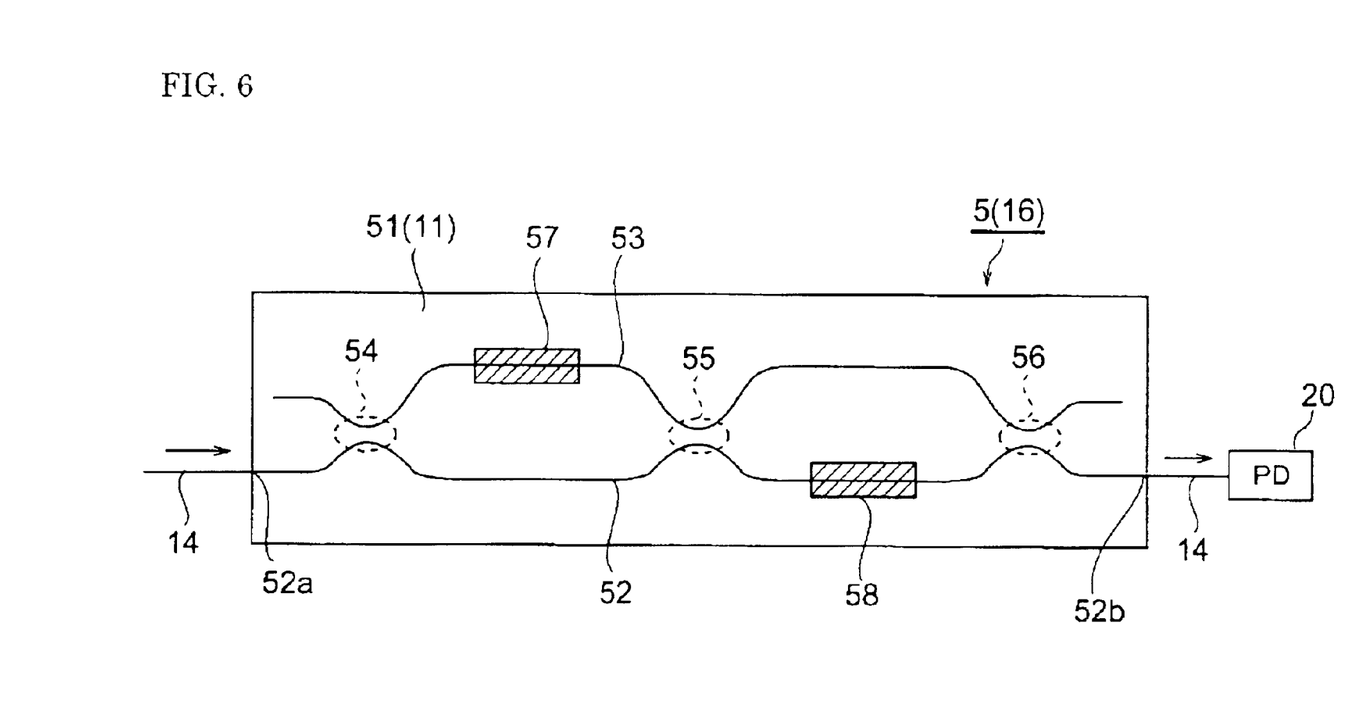
FIG. 6 is a schematic view showing another example of the optical filter used in the apparatus in FIG. 1.

FIG. 6 shows another example of the optical filter used in the apparatus for monitoring wavelength multiplexed signal light shown in FIG. 1. The optical filter 16 shown in FIG. 6 is a VASC 5 comprising two stages of Mach-Zehnder interferometers co-owning an optical coupler 55. The VASC 5 is formed on a substrate 51 (11), as a planar lightwave circuit, and comprises a main waveguide 52, a sub-waveguide 53 and heaters 57 and 58.

The main waveguide 52 is a waveguide extended between an input terminal 52a serving as a junction with the monitoring waveguide 14 on the optical coupler 15 side, and a output terminal 52b serving as a junction with the waveguide 14 on the photodiode 20 side for guiding the wavelength multiplexed signal light from the input terminal 52a to the output terminal 52b. A first optical coupler 54, a second optical coupler 55 and a third optical coupler 56 are disposed along the main waveguide 52 sequentially in a direction from the input terminal 52a toward the output terminal 52b.

On the other hand, the sub-waveguide 53 is an optical waveguide for giving respective predetermined losses to multi-channel optical signals contained in the wavelength multiplexed signal light guided through the main waveguide 52. The sub-waveguide 53 is optically coupled to the main waveguide 52 through the first coupler 54, the second coupler 55 and the third coupler 56. Then, the main waveguide 52, the sub-waveguide 53, the first coupler 54, the second coupler 55 and the third coupler 56 constitute a two stage Mach-Zehnder interferometer.

The heater 57 is a means for adjusting the temperature of the sub-waveguide 53 and is disposed between the first coupler 54 and the second coupler 55. Also, the heater 58 is a means for adjusting the temperature of the main waveguide 52 and is disposed between the second coupler 55 and the third coupler 56. By adjusting the temperatures of the sub-waveguide 53 and the main waveguide 52, the heaters 57 and 58 control an amount of phase change for each respective optical signal contained in the wavelength multiplexed signal light guided through the corresponding optical waveguide, thereby controlling the loss given to the optical signal between the input terminal 52a and output terminal 52b. With that arrangement, the VASC 5 is able to variably control the loss slope at each wavelength within the transmission band.

Figure 7:
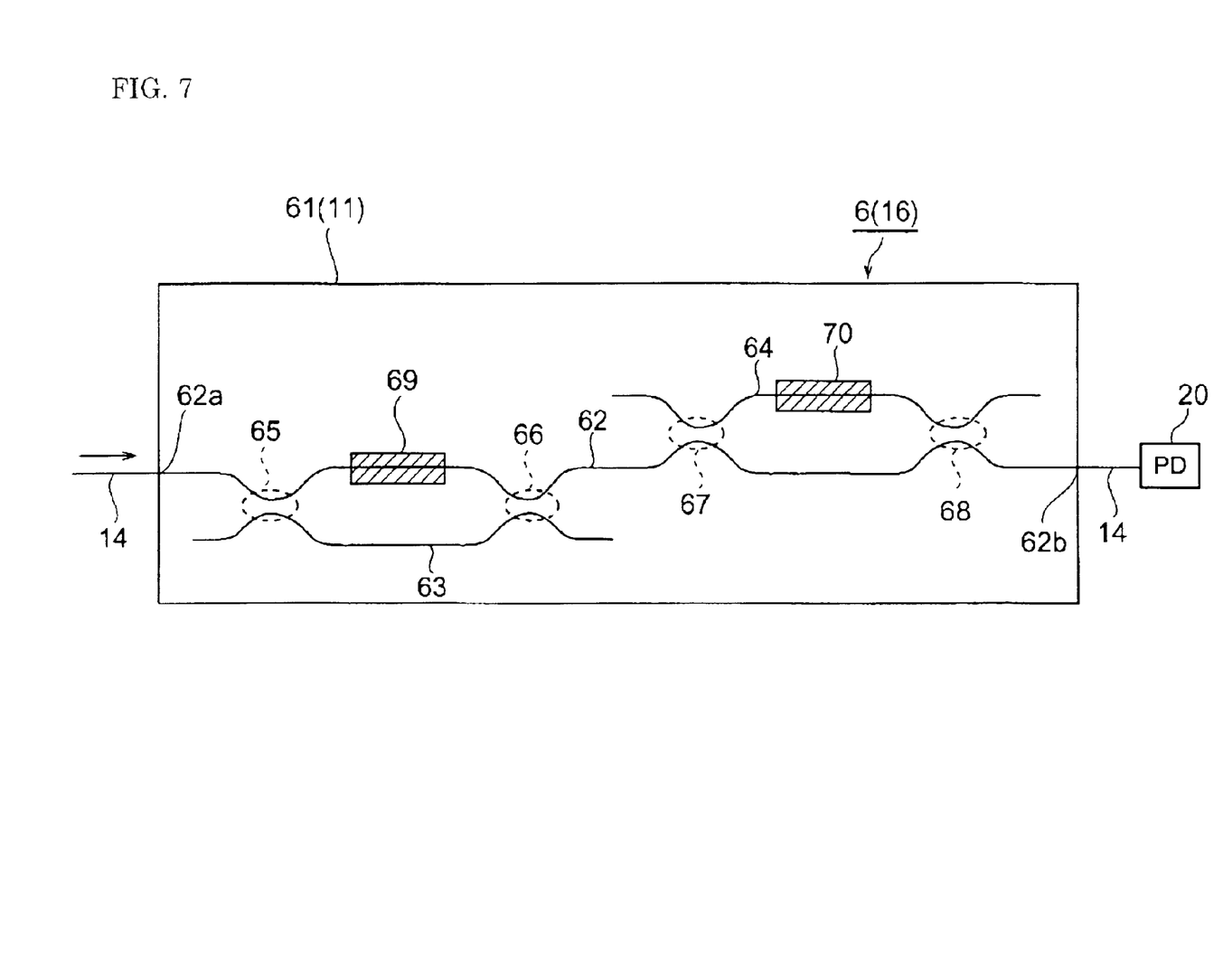
FIG. 7 is a schematic view showing one more example of the optical filter used in the apparatus in FIG. 1.

FIG. 7 shows one more example of the optical filter used in the apparatus for monitoring wavelength multiplexed signal light shown in FIG. 1. The optical filter 16 shown in FIG. 7 is a VASC 6, comprising two-stage Mach Zehnder interferometer. The VASC 6 is formed on a substrate 61 (11), as a planar lightwave circuit, and comprises a main waveguide 62, a first sub-waveguide 63, a second sub-waveguide 64 and heaters 69 and 70.

The main waveguide 62 is an optical waveguide extended between an input terminal 62a serving as a junction with the monitoring waveguide 14 on the optical coupler 15 side and a output terminal 62b serving as a junction with the monitoring waveguide 14 on the photodiode 20 side for guiding the wavelength multiplexed signal light from the input terminal 62a to the output terminal 62b. A first optical coupler 65, a second optical coupler 66, a third optical coupler 67 and a fourth optical coupler 68 are disposed along the main waveguide 62 sequentially in a direction from the input terminal 62a toward the output terminal 62b.

Both the first sub-waveguide 63 and the second sub-waveguide 64 are those for giving respective predetermined losses to multi-channel optical signals contained in the wavelength multiplexed signal light guided through the main waveguide 62. The first sub-waveguide 63 is optically coupled to the main waveguide 62 through the first coupler 65 and the second coupler 66. Then, the main waveguide 62, the first sub-waveguide 63, the first coupler 65 and the second coupler 66 constitute a first stage Mach-Zehnder interferometer. The second sub-waveguide 64 is optically coupled to the main waveguide 62 through the third coupler 67 and the fourth coupler 68. Then, the main waveguide 62, the second sub-waveguide 64, the third coupler 67 and the fourth coupler 68 constitute a second stage Mach-Zehnder interferometer.

The heater 69 is a means for adjusting the temperature of the main waveguide 62 and is disposed between the first coupler 65 and the second coupler 66. Also, the heater 70 adjusts the temperature of the second sub-waveguide 64 and is disposed between the third coupler 67 and the fourth optical coupler 68. By adjusting the temperatures of the main waveguide 62 and the second sub-waveguide 64, the heaters 69 and 70 control an amount of phase change for each of the optical signals contained in the wavelength multiplexed signal light guided through the corresponding optical waveguide, thereby controlling the loss given to the optical signal between the input terminal 62a and the output terminal 62b. With that arrangement, the VASC 6 is able to variably control the loss slope within the transmission band.

Out of the VASCs 4, 5 and 6 explained above as examples of the optical filter 16 capable of controlling the loss slope, the VASC 4 and the VASC 5 provide the loss slope changed substantially as shown in FIG. 2. On the other hand, the VASC 6 provides the loss slope and its change substantially as shown in FIG. 3. Also, comparing the VASC 4 with the VASC 5, the VASC 5 having two-stage Mach-Zehnder interferometer provides better linearity of the loss slope. A structure and characteristics (loss slope) of an optical filter are preferably selected corresponding to various conditions such as the structure of the monitoring apparatus 1 and the transmission band of the wavelength multiplexed signal light to be monitored.

EXAMPLE

An example employing one of the above-described VASCs as the optical filter capable of controlling the loss slope will be described below as an example of the method of monitoring wavelength multiplexed signal light with the monitoring apparatus 1 shown in FIG. 1. In this example, the wavelength multiplexed signal light input to the monitoring apparatus 1 was assumed to contain optical signals of 4 channels having wavelengths ($\lambda_1$=1575 nm, $\lambda_2$=1585 nm, $\lambda_3$=1595 nm and $\lambda_4$=1605 nm). Also, the VASC 5 of FIG., 4 was employed as the optical filter 16 for providing losses to the optical signals.

Figure 8:
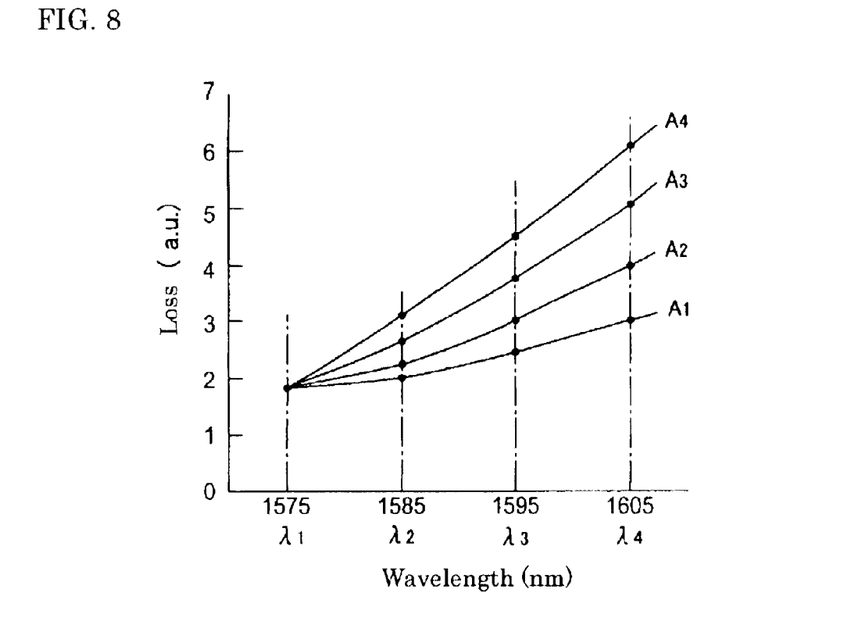
FIG. 8 is a graph showing an example of the loss pattern set by the optical filter.

Then, for the wavelength multiplexed signal light containing the above-mentioned 4 channel optical signals, electrical powers S1 and S2 supplied to the heaters 57 and 58 were set as (S1, S2)=(61.7 mW, 62.1 mW), (90.3 mW, 90.5 mW), (107.5 mW, 107.7 mW) and (120.9 mW, 121.6 mW), thereby setting four kinds of loss slopes $A_1$, $A_2$, $A_3$, and $A_4$. FIG. 8 is a graph showing the four kinds of loss slopes $A_1$ to $A_4$. Values of the losses given to the respective optical signals of the wavelengths $\lambda_1$ to $\lambda_4$ are expressed by:

$$\text{Losses (dB)} = \begin{pmatrix} \lambda_1 & \lambda_2 & \lambda_3 & \lambda_4 \\ 1.92 & 1.96 & 2.44 & 3.06 \\ 1.87 & 2.31 & 3.11 & 4.05 \\ 1.85 & 2.70 & 3.80 & 5.08 \\ 1.93 & 3.12 & 4.47 & 6.01 \end{pmatrix} \begin{matrix} \\ A_1 \\ A_2 \\ A_3 \\ A_4 \end{matrix}$$

The wavelength multiplexed signal light containing the optical signals of the wavelengths $\lambda_1$ to $\lambda_4$ having respective input power levels $P_1$ to $P_4$ was input to the VASC 5 so that the losses were given to the optical signals during passage through the VASC 5. Thereafter, the wavelength multiplexed signal light was detected by the photodiode 20. In this case, power levels $Q_1$ to $Q_4$ of the wavelength multiplexed signal light detected by the photodiode 20 are expressed by the Eq. (2) previously described, using a transmittance matrix ($a_{ij}$) of the VASC 5. The transmittance matrix ($a_{ij}$) in this example was given by:

$$(a_{ij}) = \begin{pmatrix} 0.643 & 0.637 & 0.570 & 0.494 \\ 0.650 & 0.587 & 0.489 & 0.394 \\ 0.653 & 0.537 & 0.417 & 0.310 \\ 0.641 & 0.488 & 0.357 & 0.251 \end{pmatrix}$$

Further, if the inverse matrix $(a_{ij})^{-1}$ of this transmittance matrix $(a_{ij})$:

$$(a_{ij})^{-1} = \begin{pmatrix} 81.0375 & -193.741 & 128.947 & -14.63 \\ -273.383 & 712.008 & -609.381 & 173.019 \\ 281.231 & -832.852 & 884.767 & -338.894 \\ -75.433 & 295.044 & -402.945 & 186.97 \end{pmatrix}$$

is used, input power levels $P_1$ to $P_4$ of the optical signals at wavelength $\lambda_1$ to $\lambda_4$ contained in the wavelength multiplexed signal light can be determined as monitored data of the wavelength multiplexed signal light, as expressed by Eq. (3), from the detected light power levels $Q_1$ to $Q_4$ which has been obtained as detected data.

Optical Transmission System

Figure 9:
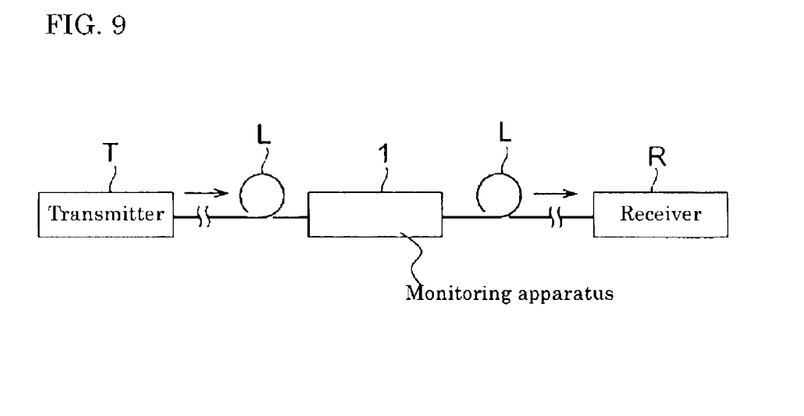
FIG. 9 is a block diagram schematically showing one embodiment of an optical transmission system.

Next, an optical transmission system utilizing the wavelength multiplexed signal light monitoring apparatus having the above-mentioned structure will be described below. FIG. 9 schematically shows one embodiment of the optical transmission system according to the present invention. The optical transmission system of this embodiment comprises a transmitter (transmitting station) T for transmitting wavelength multiplexed signal light, an optical-fiber transmission line L through which the wavelength multiplexed signal light is transmitted, and a receiver (receiving station) R for receiving the wavelength multiplexed signal light.

The monitoring apparatus 1 shown in FIG. 1 is disposed midway along the optical-fiber transmission line L. With such an arrangement, it is possible to satisfactorily monitor the wavelength multiplexed signal light being transmitted through the transmission line L, and to realize an optical transmission system with a simplified configuration including the monitoring apparatus 1.

The above optical transmission system may further include a signal light controller to control the wavelength multiplexed signal light being transmitted through the transmission line L based on monitored data of the wavelength multiplexed signal light obtained by the monitoring apparatus 1. With the installation of such a controller, the monitoring data can be fed back to control the wavelength multiplexed signal light in real time satisfactorily.

Figure 10:
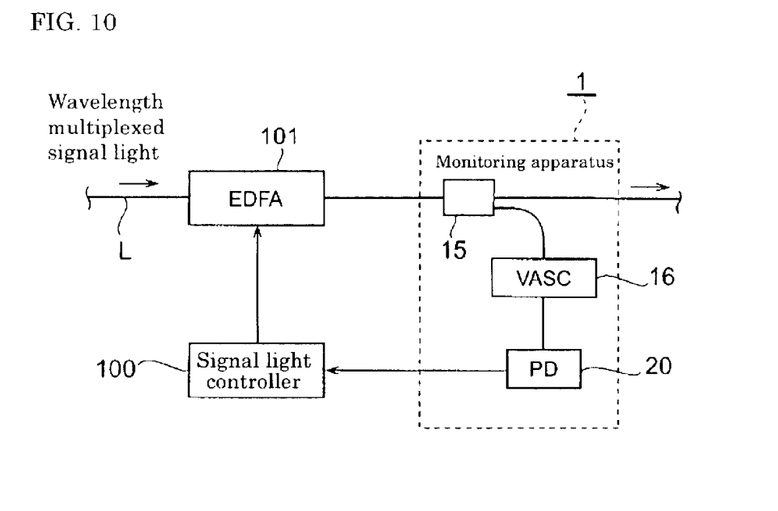
FIG. 10 is a block diagram schematically showing another embodiment of the optical transmission system.

FIG. 10 schematically shows another embodiment of the optical transmission system. In the optical transmission system of this embodiment, an Erbium-Doped Fiber Amplifier (EDFA) 101 is disposed midway along the optical-fiber transmission line L, as an optical amplifier. The wavelength multiplexed signal light transmitting through the optical-fiber transmission line L can be amplified by the EDFA 101 to a desired intensity level.

The monitoring apparatus 1 containing the optical coupler 15, the optical filter 16 and the photodiode 20 is disposed in the downstream of the EDFA 101. Further, a signal light controller 100 is disposed to control the wavelength multiplexed signal light transmitted through the optical-fiber transmission line L based on monitored data acquired by the monitoring apparatus 1. The signal light controller 100 is connected to the monitoring apparatus 1 and the EDFA 101.

A part of the wavelength multiplexed signal light is branched by the optical coupler 15 and detected by the photodiode 20 through the VASC (optical filter) 16. Detected or monitored data is sent to the signal light controller 100, which instructs controlling optical amplification of the wavelength multiplexed signal light by the EDFA 101.

Figure 11:
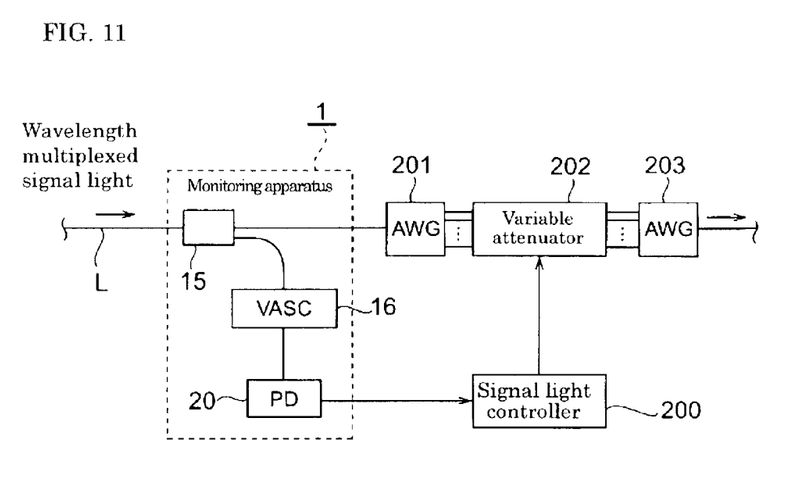
FIG. 11 is a block diagram schematically showing one more embodiment of the optical transmission system.

FIG. 11 schematically shows one more embodiment of the optical transmission system. In the optical transmission system of this embodiment, an AWG 201, a multi-channel variable attenuator 202, and an AWG 203 are disposed sequentially on the optical-fiber transmission line L. Wavelength multiplexed signal light transmitted through the optical-fiber transmission line L is branched by the AWG 201 and attenuated to a desired intensity level by the variable attenuator 202 for each channel (optical signal). Thereafter, the branched light is multiplexed again by the AWG 203.

The monitoring apparatus 1 is disposed in the upstream of the AWG 201. Further, a signal light controller 200 is disposed to control the wavelength multiplexed signal light based on monitored data obtained by the monitoring apparatus 1. The signal light controller 200 is connected to the monitoring apparatus 1 and the variable attenuator 202. Detected data obtained by the monitoring apparatus 1 or monitored data from the detected data is sent to the signal light controller 200. Based on the monitoring data, the signal light controller 200 instructs control the optical attenuation of the wavelength multiplexed signal light by the variable attenuator 202.

Figure 12:
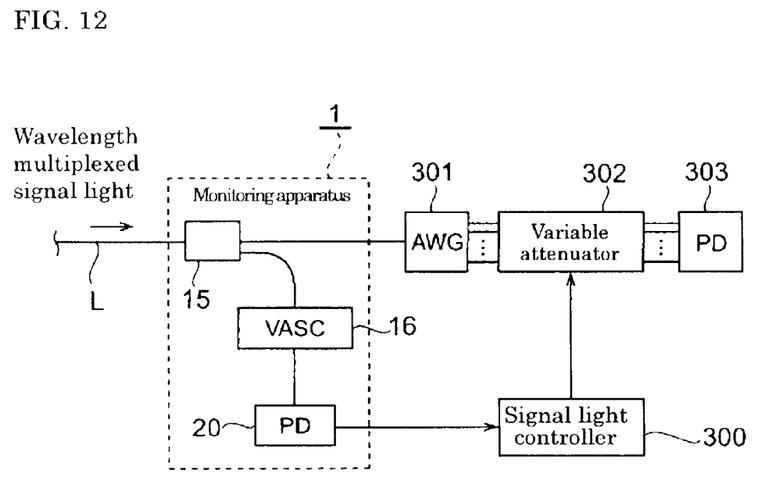
FIG. 12 is a block diagram schematically showing further one more embodiment of the optical transmission system.

FIG. 12 schematically shows further one more embodiment of the optical transmission system. In the optical transmission system of this embodiment, a photodiode 303 is disposed in place of the AWG 203 in the optical transmission system of FIG. 11. Wavelength multiplexed signal light transmitted through the optical-fiber transmission line L is branched by an AWG 301 and attenuated to a desired intensity level by a variable attenuator 302 for each channel. Thereafter, the attenuated light is detected by the photodiode 303.

Thus, by employing detected or monitored data of the wavelength multiplexed signal light obtained by the monitoring apparatus and controlling the operation of an optical device, such as an optical amplifier or attenuator, disposed on the line L through a signal light controller, the status of the wavelength multiplexed signal light being transmitted through the optical-fiber transmission line L, e.g., power for each multi-channel optical signals contained in the wavelength multiplexed signal light, can be controlled in a satisfactory manner.

The signal light controller can be disposed in the monitoring apparatus or in the optical device, such as the optical amplifier or attenuator which is to be controlled thereby. In the monitoring apparatus 1 of FIG. 1, for example, the control unit 30 may be designed so as to have function of the signal light controller to instruct control of another optical device. Alternatively, the signal light controller may be disposed as an independent controller separate from the monitoring apparatus and the optical device to be controlled.

CONCLUSION

The apparatus for and method of monitoring wavelength multiplexed signal light and the optical transmission system employing them, according to the present invention, can be modified in various ways. For example, any suitable optical filter other than the above-explained VASCs can also be used as the optical filter. Further, the arrangement may be modified such that only detected data may be obtained in the monitoring apparatus 1, and monitored data may be obtained by another operating unit. Further, a display may be connected to the control unit 30 so that the obtained data can be displayed to an operator.

Moreover, the number M of loss slopes set by the optical filter for the wavelength multiplexed signal light containing N-channel optical signals may be determined to be "M>N" to improve accuracy of the monitored data. On the contrary, the number M may be to be "M<N". In case of "M<N", power for each channel cannot be obtained, but monitored data regarding, e.g., a distributed status of signal light power can be obtained under certain restrictions. For example, one modified power monitoring method can be implemented by setting "M=N/2" and detected optical signals by a two-channel unit. Monitored data by such a monitoring method can be sufficiently and effectively utilized in, e.g., an optical amplifier to control distribution of optical amplification rates by wavelength.

What is claimed is:

1. An apparatus for monitoring wavelength multiplexed signal light containing multi-channel optical signals having different wavelengths from each other within a transmission band, said apparatus comprising:

an input waveguide;

an output waveguide;

a monitoring waveguide;

optical branching means provided between the input and output waveguides for branching a part of the signal light to the monitoring waveguide;

a controllable optical filter provided on said monitoring waveguide that gives a loss pattern to said optical signals, wherein said optical filter simultaneously passes every channel optical signal within said transmission band; and light-detecting means provided at an output end of the monitoring waveguide.

2. An apparatus for monitoring wavelength multiplexed signal light according to claim 1, wherein said loss pattern provides losses in a substantially linear relation with wavelength, and a loss slope is controllable.

3. An apparatus for monitoring wavelength multiplexed signal light according to claim 1, further comprising an operating circuit for obtaining data for the multi-channel optical signals from the data of said wavelength multiplexed signal light detected by said light detecting means for each of a plurality of different loss patterns which are set in sequence by said optical filter.

4. An apparatus for monitoring wavelength multiplexed signal light according to claim 3, wherein the number of said optical signals is N (N being an integer not less than 2);

the number of said loss patterns is N; and

N sets of said monitored data for said optical signals are obtained from N sets of said data detected for the respective loss patterns.

5. An apparatus for monitoring wavelength multiplexed signal light according to claim 1, wherein said optical filter is able to control the loss pattern by an electrical control signal.

6. An apparatus for monitoring wavelength multiplexed signal light according to claim 1, wherein said optical filter comprises:

a main waveguide for guiding the signal light from the optical branching means to light detecting means;

a sub-waveguide optically coupled to the main waveguide through a first coupler and a second coupler, said sub-waveguide constituting a Mach-Zehnder interferometer with the main waveguide, the first optical coupler and the second optical coupler; and a means for adjusting the temperature of at least one of the main waveguide and sub-waveguide located between the first and second couplers, thereby controlling the loss pattern.

7. An apparatus for monitoring wavelength multiplexed signal light according to claim 1, wherein the optical branching means and the optical filter are formed on the same substrate as a planar lightwave circuit.

8. An apparatus for monitoring wavelength multiplexed signal light according to claim 1, wherein the optical branching means is an optical coupler having a coupling ratio not exceeding 10%.

9. An optical transmission system comprising:

an optical transmission line through which is transmitted wavelength multiplexed signal light containing multi-channel optical signals having different wavelengths from each other within a transmission band; and an apparatus disposed on said optical transmission line for monitoring said signal light, said apparatus comprising an input waveguide; an output waveguide; a monitoring waveguide; an optical branching means provided between the input and output waveguides for branching a part of signal light to the monitoring waveguide; a controllable optical filter provided on the monitoring waveguide which gives a loss pattern to the optical signals, said optical filter simultaneously passes every channel optical signal within said transmission band; light detecting means provided at an output end of the monitoring waveguide.

10. An optical transmission system according to claim 9, further comprising a signal light control means for instructing control of status of the signal light based on monitored data for the multi-channel optical signals obtained by the apparatus.

11. A method of monitoring wavelength multiplexed signal light containing multi-channel optical signals having different wavelengths from each other within a transmission band, said method comprising the steps of:

first step of branching a part of said signal light to a monitoring waveguide;

second step for giving a loss pattern, by way of a controllable optical filter, to the optical signals contained in the branched signal light, wherein said optical filter simultaneously passes every channel optical signal within said transmission band;

and third step of detecting the branched signal light to which the loss pattern has been given, the second step and third step being performed plural times while setting a plurality of loss patterns in sequence different from each other.

12. A method of monitoring wavelength multiplexed signal light according to claim 11, wherein the loss pattern provides losses in a substantially linear relation with wavelength, and a loss slope is controllable.

13. A method of monitoring wavelength multiplexed signal light according to claim 11, further comprising a fourth step of obtaining monitored data for the multi-channel optical signals contained in said wavelength multiplexed signal light from the data detected in the third step.

14. A method of monitoring wavelength multiplexed signal light according to claim 13, wherein the channel number of the optical signals is N (N being an integer not less than 2);

the number of said loss patterns is N; and

N sets of the monitored data for the optical signals are obtained from N sets of the detected data for the respective loss patterns.

* * * * *